(12) United States Patent
Ben-Tsvi (10) Patent No.: US 11,154,986 B2
(45) Date of Patent: Oct. 26, 2021

(54) LOCAL REPLANNING OF ROBOT MOVEMENTS

(71) Applicant: X Development LLC, Mountain View, CA (US)

(72) Inventor: Ytai Ben-Tsvi, Sunnyvale, CA (US)

(73) Assignee: INTRINSIC INNOVATION LLC, Mountain View, CA (US)

( * ) Notice: Subject to any disclaimer, the term of this patent is extended or adjusted under 35 U.S.C. 154(b) by 234 days.

(21) Appl. No.: 16/256,965

(22) Filed: Jan. 24, 2019

(65) Prior Publication Data
US 2020/0238513 A1 Jul. 30, 2020

(51) Int. Cl.
*B25J 9/16* (2006.01)

(52) U.S. Cl.
CPC ........... *B25J 9/1605* (2013.01); *B25J 9/1694* (2013.01)

(58) Field of Classification Search
CPC .............................. B25J 9/1605; B25J 9/1694
See application file for complete search history.

(56) References Cited

U.S. PATENT DOCUMENTS

| | | | |
|---|---|---|---|
| 5,347,459 A | 9/1994 | Greenspan et al. | |
| 5,434,489 A | 7/1995 | Cheng et al. | |
| 5,452,238 A | 9/1995 | Kramer et al. | |
| 5,499,320 A | 3/1996 | Backes et al. | |
| 5,579,444 A | 11/1996 | Dalziel et al. | |
| 6,004,016 A | 12/1999 | Spector | |
| 6,292,715 B1 | 9/2001 | Rongo | |
| 6,370,573 B1 | 4/2002 | Bowman-Amuah | |
| 6,418,350 B1 * | 7/2002 | Hamidzadeh | G05B 19/41865 700/100 |
| 6,470,225 B1 | 10/2002 | Yutkowitz | |
| 6,493,607 B1 | 12/2002 | Bourne et al. | |
| 6,804,580 B1 | 10/2004 | Stoddard et al. | |
| 2004/0078109 A1 | 4/2004 | Babikian et al. | |
| 2004/0254771 A1 | 12/2004 | Reiner et al. | |
| 2005/0278049 A1 * | 12/2005 | Van Den Nieuwelaar | G03F 7/70533 700/100 |

(Continued)

OTHER PUBLICATIONS

PCT International Search Report and Written Opinion in International Appln. No. PCT/US2020/015003, dated May 4, 2020, 18 pages.

(Continued)

*Primary Examiner* — Gary Collins
(74) *Attorney, Agent, or Firm* — Fish & Richardson P.C.

(57) ABSTRACT

Systems, methods, devices, and other techniques for planning and re-planning robot motions. The techniques can include obtaining a schedule that defines an execution order for a plurality of plans, each plan defining a sequence of tasks; providing instructions to the robotic system to execute plans from the plurality of plans according to the schedule; obtaining measurements for one or more parameters that represent a state of the robotic system or its environment that results from execution of at least one plan from the plurality of plans; determining, based on the measurements, that a particular plan from the plurality of plans, which has not completed execution, is to be revised; generating, using the measurements, a revised version of the particular plan; and adjusting the schedule so as to resolve a conflict between the revised version of the particular plan and at least one other plan in the plurality of plans.

17 Claims, 4 Drawing Sheets

(56) References Cited

U.S. PATENT DOCUMENTS

| | | | | |
|---|---|---|---|---|
| 2008/0294279 A1* | 11/2008 | Tiozzo | ............... | G06Q 10/06 700/100 |
| 2013/0282182 A1* | 10/2013 | Hideg | ............... | B23K 31/02 700/275 |
| 2014/0278091 A1 | 9/2014 | Horvitz et al. | | |
| 2015/0269533 A1* | 9/2015 | Garg | ............... | G06Q 10/1097 705/7.21 |

OTHER PUBLICATIONS

Sellner et al., "Proactive Replanning for Multi-Robot Teams," retrieved from URL <http://173.236.148.201/brennan/papers/sellner_proposal.pdf>, Jun. 2006, 51 pages.

Smith et al., "Multi-Agent Management of Joint Schedules," retrieved from URL <https://www.researchgate.net/profile/Stephen_Smith14/publication/221250619_Multi_Agent_Management_of-Joint_Schedules/links/00b4951881d907ee99000000/Multi-Agent-Management-of-Joint-Schedules.pdf>, Jan. 2006, 9 pages.

Araujo et al. "Hierarchical Scheduling of Robotic Assembly Operations in a Flexible Manufacturing System," Fifth International FAIM Conference, Jun. 1995, 12 pages.

Dean et al. "An Analysis of Time-Dependent Planning," AAAI, Aug. 1988, 6 pages.

Li et al. "A Review on Integrated Process Planning and Scheduling," Int. J. Manufacturing Research, vol. 5(2), Jan. 2010, 20 pages.

Martin et al. "Technology and Innovation for the Future of Production: Accelerating Value Creation," White paper, World Economic Forum, Mar. 2017, 38 pages.

Ruml et al. "On-line Planning and Scheduling: An Application to Controlling Modular Printers," Journal of Artificial Intelligence Research vol. 40, Feb. 2011, 54 pages.

Sun et al. "A Model-Driven Approach to Support Engineering Changes in Industrial Robotics Software," International Conference on Model Driven Engineering Languages and Systems, Sep. 2012, 15 pages.

* cited by examiner

LOCAL REPLANNING OF ROBOT MOVEMENTS

BACKGROUND

Robots have been employed in various settings and industries to automate manufacturing and fabrication processes. Some systems have been developed that provide multiple, individually functioning robots configured to operate concurrently in a shared workspace. Multiple robots in a robotic system can be programmed to execute tasks to achieve a goal, such as the production of an item of manufacture, the assembly of a device, the fabrication of a component, or the inspection of an object. For example, in an automotive assembly line, robots with articulating arms may surround a chassis of a vehicle and operate in the workspace occupied by the chassis to attach components, apply machining operations (e.g., drilling, spot welding, milling, or grinding one or more portions of the chassis), perform measurements and inspections, or perform a combination of these and other operations. Each robot, for example, may pivot about a base, and may extend from the base with one, two, three, or more articulating segments, thereby allowing it to move and reach a portion or entirety of the shared workspace. The base itself may be fixed, or may move in one or more dimensions, as well. To complete a production goal, robots in a robotic system may perform individual tasks serially and/or concurrently with other robots, and may be required to share not only a common workspace, but also resources such as tools or supplies. A controller can coordinate the movements and execution of tasks by robots that share such resources.

SUMMARY

This specification generally describes systems, methods, devices, and other techniques for planning the movements of robots, and more specifically, to techniques for re-planning the movements of the robots based on real-time feedback about the robots' execution of a process.

In some implementations, a robotic system receives, from a scheduler system, a schedule that defines an execution order for multiple plans, where each plan includes at least one task to be performed by the robotic system. At least one particular plan of the schedule includes a speculation point. In general, a speculation point of a plan can refer to a point in which the robotic system requires or can accept one or more parameters in order to continue executing the plan. The parameters can relate to or describe measurements that have been taken during execution of the schedule up to the speculation point (e.g., measurements taken during or following previously executed plans and/or measurements taken during the current plan based on previously executed tasks up to the speculation point). The measurements can relate to results of previously executed tasks or plans, such as dimensions or locations of features in a workplace, for example. One or more robots of the robotic system executes the plans of the schedule until the scheduler system determines that the speculation point is reached, at which time further execution of the particular plan is contingent on additional input to the robotic system. The additional input may require the scheduler system to revise the particular plan. If required, the scheduler system revises the particular plan to generate a revised version of the particular plan. If the particular plan is revised, the scheduler system checks the schedule to determine if the particular plan conflicts with any other plans of the schedule. If there is no conflict detected, the robotic system resumes execution of the schedule. If the scheduler system detects a conflict, then it adds a dependency between the particular plan and the conflicting plan. The dependency requires the robotic system to complete execution of the particular plan before beginning execution of the conflicting plan.

In general, a first aspect includes a computer-implemented method that includes: obtaining a schedule that defines an execution order for a plurality of plans, each plan defining a sequence of tasks to be executed by a robotic system; providing instructions to the robotic system to execute plans from the plurality of plans according to the schedule; obtaining measurements for one or more parameters that represent a state of the robotic system or its environment that results from execution of at least one plan from the plurality of plans; determining, based on the measurements for the one or more parameters that represent the state of the robotic system or its environment, that a particular plan from the plurality of plans, which has not completed execution, is to be revised; generating, using the measurements for the one or more parameters that represent the state of the robotic system or its environment, a revised version of the particular plan; and adjusting the schedule that defines the execution order for the plurality of plans so as to resolve a conflict between the revised version of the particular plan and at least one other plan in the plurality of plans.

In some embodiments, adjusting the schedule that defines the execution order for the plurality of plans includes delaying execution of the at least one other plan that conflicts with the revised version of the particular plan by adding a dependency between the at least one other plan and the revised version of the particular plan. The dependency conditions execution of the at least one other plan on completion of execution of the revised version of the particular plan. In other embodiments, adjusting the schedule that defines the execution order for the plurality of plans comprises enforcing a constraint that fixes the sequences of tasks defined by each plan in the plurality of plans other than the particular plan.

In some embodiments, the computer-implemented method further includes providing instructions to the robotic system to execute plans from the plurality of plans, including the revised version of the particular plan, according to the adjusted schedule.

In some embodiments, the computer-implemented method further includes adjusting the schedule that defines the execution order for the plurality of plans without revising any plans in the plurality of plans other than the particular plan.

In some embodiments, the computer-implemented method includes determining whether any conflicts in the schedule result from replacing the particular plan with the revised version of the particular plan and, in response to determining that a conflict results between the revised version of the particular plan and at least one other plan in the plurality of plans, adding a dependency between the revised version of the particular plan and the at least one other plan so as to resolve the conflict.

In some embodiments, the computer-implemented method of claim 3, wherein determining whether any conflicts in the schedule result from replacing the particular plan with the revised version of the particular plan comprises determining whether the schedule would require concurrent execution of two or more plans that make use of a common resource.

In some embodiments, the common resource is space, fuel, or a tool.

In some embodiments, an initial version of the particular plan and the revised version of the particular plan have at least one of different execution times or different resource requirements.

In some embodiments, the obtained schedule is an initial version of the schedule and the method further includes generating the initial version of the schedule based on at least one of expected execution times for the plurality of plans or expected resource requirements for the plurality of plans. At least one of an expected execution time or an expected resource requirement for the particular plan is based on expected values for the one or more parameters that represent the current state of the robotic system or its environment.

In some embodiments, the measurements for the one or more parameters that represent the current state of the robotic system or its environment are different from the expected values for the one or more parameters.

In some embodiments, the one or more parameters that represent the current state of the robotic system or its environment include a first parameter that represents a result of executing one or more tasks in the particular plan before the particular plan completes execution.

In some embodiments, the result of the one or more tasks includes a location or a dimension of a component that was made or placed on a product by a robotic system in the course of execution of one or more plans.

In some embodiments, the robotic system includes a plurality of robots configured to work cooperatively in an automated process to fabricate a product.

Other implementations of this and other aspects include corresponding systems and one or more non-transitory computer-readable media having instructions stored thereon that, when executed by one or more processors, cause performance of the actions of the computer implemented methods.

Some implementations of the subject matter disclosed herein can, in certain instances, achieve one or more of the following advantages. A schedule defining an execution order for multiple plans can be pre-generated, without having to anticipate each potential conflict that may arise during the execution of the multiple plans. The process of accounting for each potential conflict may be computationally infeasible if there are a large number of plans. Therefore, pre-generating a schedule represents a feasible alternative with greatly reduced computational complexity. Furthermore, when input to the robotic system is received, the disclosed subject matter allows for one particular plan to be revised locally, without requiring a complex rescheduling of each plan in the schedule.

DETAILED DESCRIPTION

This specification generally describes systems, methods, devices, and other techniques for planning the movements of robots, and more specifically, to techniques for re-planning the movements of the robots based on real-time feedback about the robots' execution of a process.

One or more robots can receive a schedule that describes an ordered sequence of movements to be performed by the robots. In general, each schedule can describe one or more plans, and each plan describes one or more tasks for the robots to perform. For example, a schedule can include a set of plans related to assembling components of a car. A first plan can relate to attaching the driver's side door of the car, while a second plan can relate to attaching the passenger's side door. Following this example, the tasks of the first and second plans can include a series of bolting actions that together attach the doors to their respective sides. While the first and second plans may include the same or similar tasks, they may be included in different plans. For example, the tasks may be separated into different plans based on the relative location of tasks, e.g., a first plan may include one or more tasks that are to be performed in a first location, while a second plan may include one or more tasks that are to be performed in a second location. As another example, the tasks may be separated because given two of the same tool, the two plans can be performed concurrently by two different robots.

In some cases, a plan can include a speculation point, which represents a task or a point in time in which further execution of the plan is contingent on additional input to the robotic system. Based on the additional input received, the scheduler system may revise the particular plan and then resolve any conflicts that may arise between the revised version of the particular plan and other plans of the schedule, which have not yet finished/completed execution.

Referring now to FIGS. 1A-1D, a series of schedules are depicted for an example scenario that involves generating a revised version of a plan, detecting conflicts, and delaying a plan to resolve a detected conflict.

Each of FIGS. 1A-1D illustrates a different schedule, i.e., schedules 100A through 100D, respectively. Boxes A, B, C, D of FIGS. 1A-1D each represent a plan. The positions of the plans along the horizontal axis shows the relative timing of each plan. Although not explicitly shown with respect to each plan of the schedules 100A-100D, each plan includes a series of tasks to be performed by the robotic system.

Dependencies between plans are represented by arrows between boxes. Two plans are said to be dependent, if the robotic system must execute one of the two plans before the other. That is, if a second plan is dependent on a first plan, then the robotic system must execute the first plan before executing the second plan. The dependencies between plans can be caused by, for example, a resource requirement that is shared by two plans, e.g., if the execution of a second plan requires a resource, which the execution of the first plan also requires, then the robotic system cannot execute the second plan until it executes the first plan.

A resource used by the robotic system can include physical resources, such as supplies or a tool. A resource can also include physical space, such as space in the environment of the robot, for example, in a warehouse or production facility.

If instead two plans are independent of one another, then the robotic system can execute the two plans in any order or at the same time. For example, two plans may be independent of one another if they can each be executed independently of one another (e.g., with different robots of the robotic system and without conflicts that would arise from concurrent use of a shared resource).

Figure 1A:
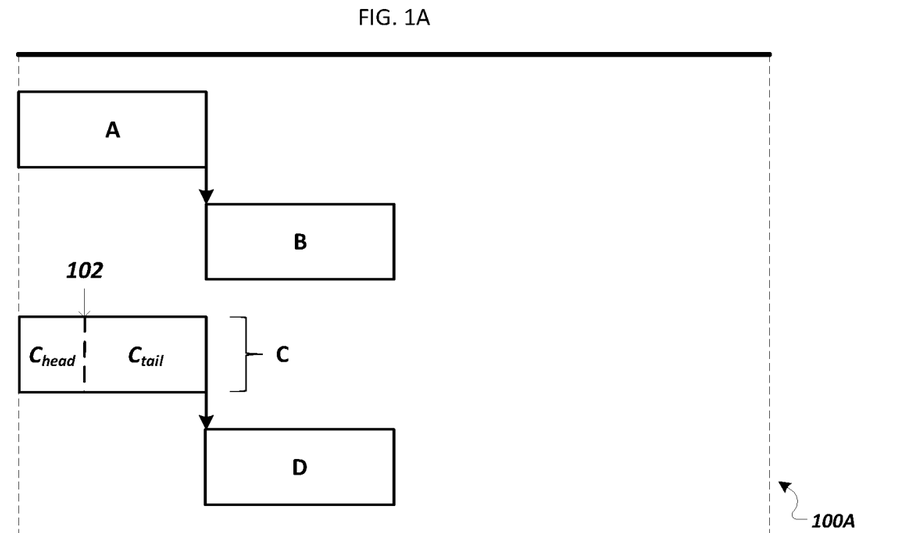
FIG. 1A is a schedule of plans that can be executed by a robotic system including plans A, B, C, and D.

FIG. 1A is a schedule 100A of plans that can be executed by a robotic system. Schedule 100A includes plans A, B, C, and D. Plan C includes two parts, $C_{head}$ and $C_{tail}$. Plan B is dependent on plan A, while plan D is dependent on plan C, as shown by the arrows that connect the plans. Because plan B is dependent on plan A, the robotic system executes plan B only after executing plan A. Similarly, plan D is dependent on plan C, with plan D executing only after plan C is executed.

Schedule 100A also shows that plans A and B are independent of plans C and D. In some cases, independent plans can be executed at the same time. For example, plan A can be executed at the same time as plan C, as shown by an overlap between the two plans with respect to their vertical positions. Similarly, schedule 100A shows that plans B and D are executed concurrently.

In general, the starting and ending times of plans are not set in advance by a schedule. Rather, the starting and ending times are based on the dependencies between plans, i.e., the time at which a particular plan becomes executable by a robot based on, for example, what plans are to be executed before the execution of the particular plan.

Plan C includes a speculation point 102, shown by a dashed line. In general, a speculation point of a plan identifies a point in which the robotic system requires or can accept one or more parameters in order to continue executing the plan. In some implementations, the one or more parameters represent a current state of the robotic system or its environment. For example, the one or more parameters can represent an actual dimension of a part or product being fabricated, which may be more or less than a nominal dimension specified in a schematic for the part or product. In another example, the parameters can represent a quantity of a particular resource that is required for the execution of the tasks of a plan, e.g., a number of bolts available to a robot before the robot begins executing a series of bolting tasks.

While the robotic system executes plan C, the robotic system uses one or more sensors to determine measurements for one or more parameters that represent a current state of the robotic system or its environment. The robotic system communicates the measurements to a scheduler system, which determines the current state of the robotic system or its environment. Speculation point 102 represents a time at which the scheduler system determines, based on the current state of the robotic system or its environment, that plan C may need to be re-planned.

Figure 1B:
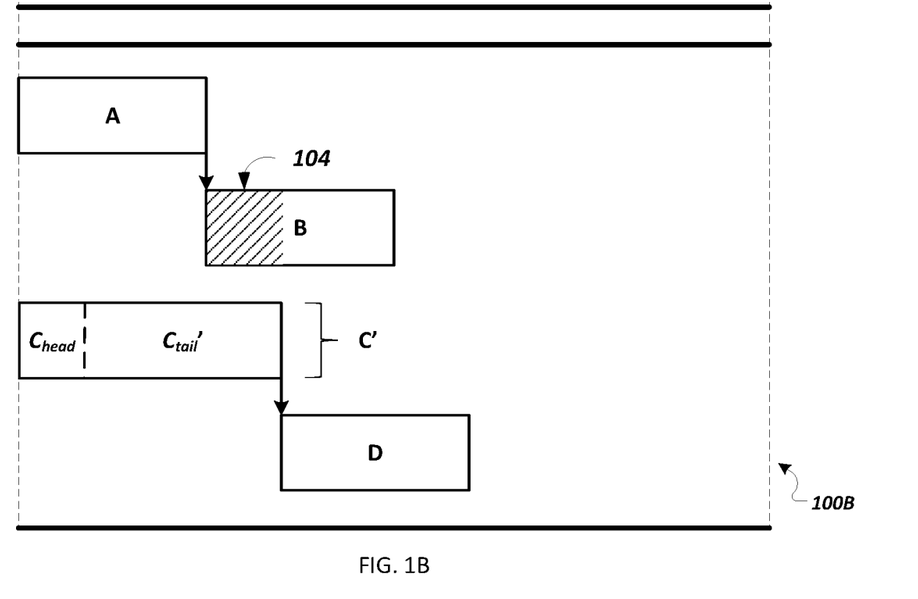
FIG. 1B is a schedule that shows a revised version of plan C and a conflict arising from plan C being revised.

In response to determining that plan C should be re-planned, the scheduler system generates a revised version of plan C. FIG. 1B is a schedule 100B that shows plans A, B, and D. Schedule 100B also shows plan C', which is the revised version of plan C. Like plan C, plan C' includes $C_{head}$, because the robotic system executes the tasks included in $C_{head}$ prior to speculation point 102. Instead of including $C_{tail}$, C' includes $C_{tail}'$, which is the revised version of $C_{tail}$. $C_{tail}'$ includes additional tasks, resulting in the plan taking longer to be executed than $C_{tail}$, as shown by the plan's wider profile with respect to the horizontal axis. When the scheduler system generates C', the dependencies that existed between C and the other plans of schedule 100A, i.e., plan D, are inherited by plan C'.

In some implementations, an initial version of a plan and a revised version of the plan differ in resource requirements. For example, if a first plan and a second plan both require the use of a first paint sprayer, then a revised version of the second plan can differ from the initial version of the second plan by requiring the use of a second paint sprayer.

FIG. 1B also shows a conflict arising from plan C being revised. Unlike plans A and C, which can be executed concurrently, plan B cannot be executed at the same time as plans C or C'. The portion of plan B which overlaps with plan C', with respect to the horizontal positions of the two plans, is shown as conflict 104.

Figure 1C:
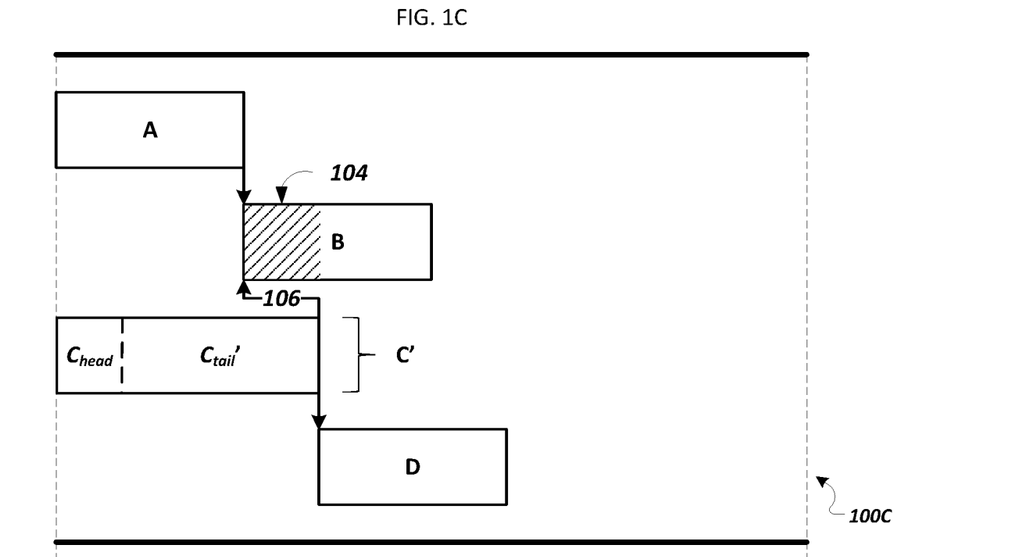
FIG. 1C is a schedule that shows a dependency that is added between plans B and the revised version of plan C.

To ensure that the robotic system can execute both the tasks of plan B and the tasks of plan C', the scheduler system resolves conflict 104 by adding a dependency between the conflicting plans. Referring to FIG. 1C, a schedule 100C includes a dependency 106, which the scheduler system adds between plans B and C'. More specifically, dependency 106 illustrates that plan B depends on plan C'.

Figure 1D:
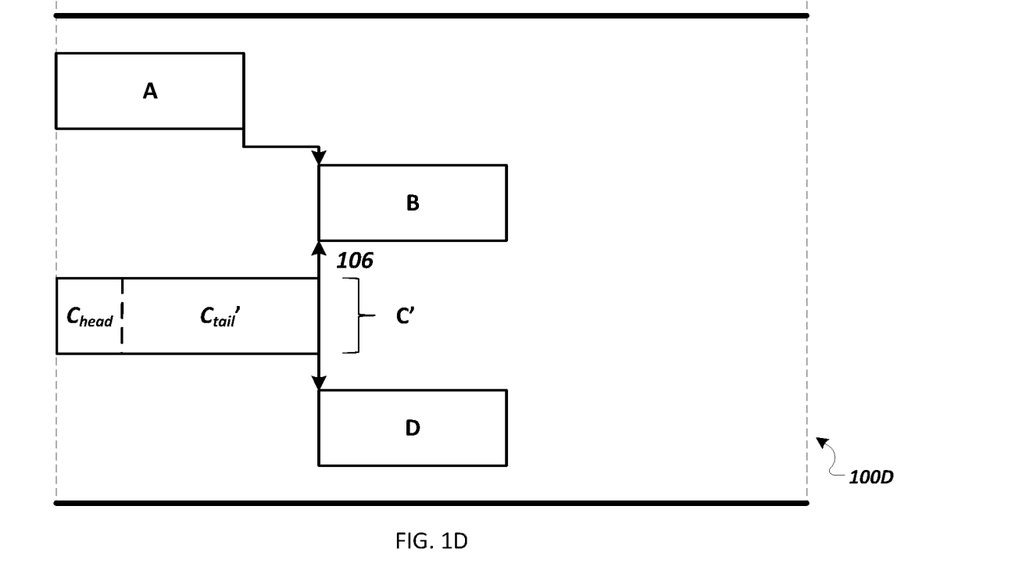
FIG. 1D is a schedule free of the conflict shown in FIG. 1B.

With the addition of dependency 106, plan B is dependent on plan A and plan C'. Therefore, the robotic system must execute both plan A and plan C' before executing plan B. Because of the addition of dependency 106, the execution of plan B is delayed until after plan C'. Referring to FIG. 1D, a schedule 100D after conflict 104 has been resolved by the addition of dependency 106.

FIG. 1D also shows that no other plan, apart from plan C, is revised in light of the scheduler system determining that plan C includes speculation point 102. That is, the scheduler system can be configured to resolve conflicts without revising plans that do not include a speculation point. Since the scheduler system can be configured to resolve conflicts arising during execution of a process, the scheduler can avoid the expense of re-generating optimized plans from scratch to resolve a conflict, and can instead perform more modest scheduling adjustments that involve re-scheduling existing plans without revising the tasks or sequence of tasks within each plan. For example, comparing schedules 100A and 100D, plans A, B, and D are not affected by the local re-planning that that scheduler system performs in response to conflict 104.

Figure 2:
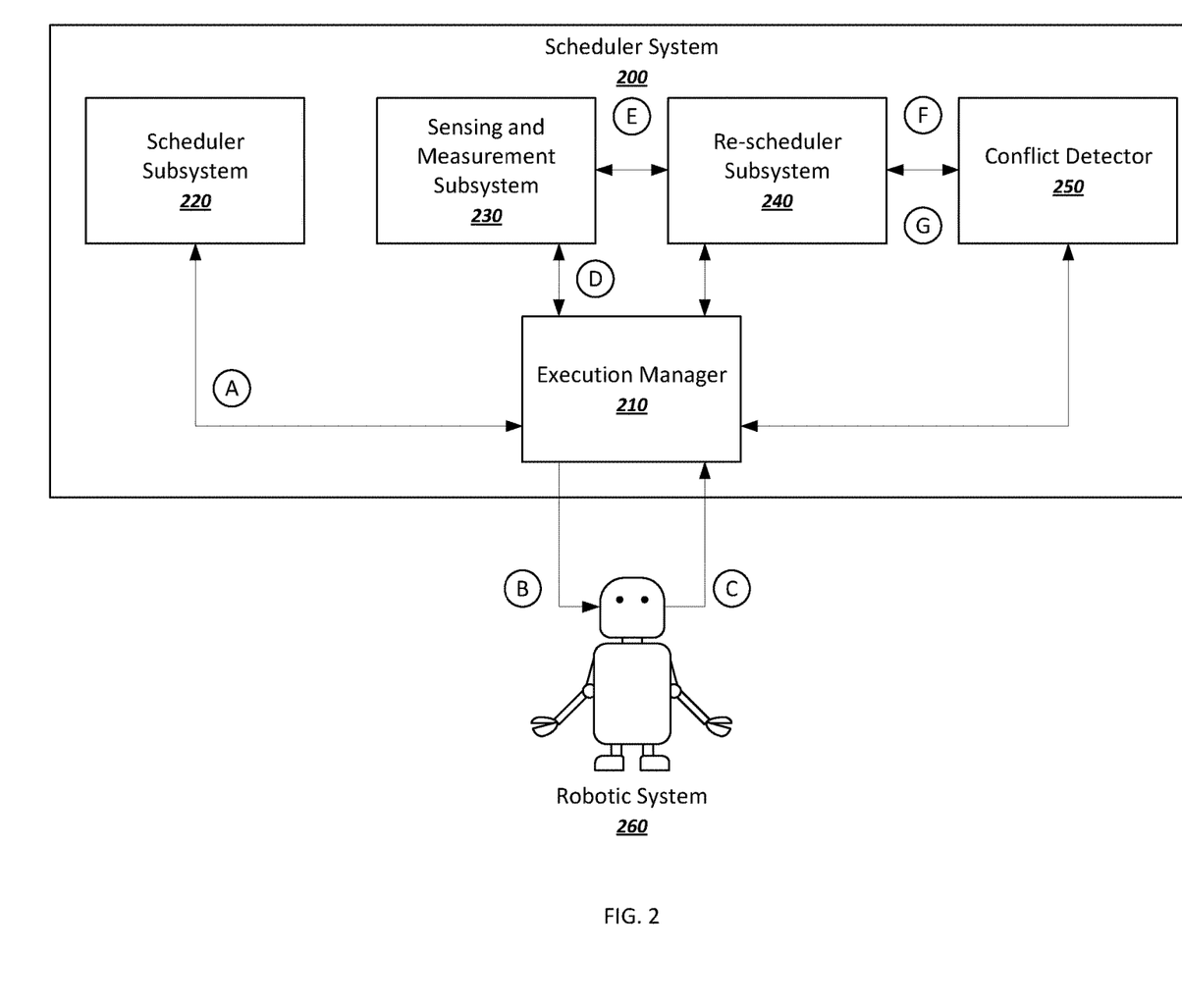
FIG. 2 is a block diagram showing an example scheduler system and a robotic system.

FIG. 2 shows a block diagram of an example scheduler system 200 in communication with a robotic system 260. For example, robotic system 260 can include one or more robots configured to work cooperatively in an automated process to fabricate a product. The scheduler system 200 includes an execution manager 210, which is communicatively coupled to a scheduler subsystem 220, a sensing and measurement subsystem 230, a re-scheduler subsystem 240, and a conflict detector 250. In addition to showing the components of the scheduler system 200 and the robotic system 260, FIG. 2 also shows stages A through G, which illustrate a flow of data.

Scheduler subsystem 220 is configured to receive data representing a set of tasks to be performed by robotic system 260, and to output a schedule to be executed by robotic system 260. As discussed above, each schedule includes one or more plans, while each plan includes one or more tasks. Each task corresponds to an action to be completed by robotic system 260. For example, a task of a plan can include performing a physical action, e.g., a first task can be riveting components, while a second task can be spray painting the riveted components. Accordingly, robotic system 260 may require a certain tool in order to complete a particular task. Following the previous example, robotic system 260 may require a rivet tool to complete the first task, while the system may require a paint sprayer and paint to complete the second task.

Scheduler system 200 also includes sensing and measurement subsystem 140, which is configured to interface with one or more sensors of the robotic system 260. Sensing and measurement subsystem 230 receives measurements for one or more parameters and determines the current state of robotic system 260 based on the measurements. Sensing and measurement subsystem 230 can communicate data representing the current state of robotic system 260 to re-scheduler subsystem 240.

Re-scheduler subsystem 240 is configured to receive data representing the current state of robotic system 260 and to generate a revised version of a plan based on the current state. Re-scheduler subsystem 240 is also configured to generate a revised schedule that includes one or more delayed plans.

The revised version of the plan generated by re-scheduler subsystem 240 may conflict with one or more other plans in the schedule. Conflict detector 250 is configured to identify conflicts between the revised plan and one or more other plans in the schedule. If conflict detector 250 identifies a conflict, re-scheduler subsystem 240 adjusts the schedule to resolve the conflict. For example, if the execution of a first plan would conflict with the execution of a second plan, then re-scheduler subsystem 240 can generate a revised schedule in which the second plan is delayed, so that the first and second plans no longer conflict.

In the example of FIG. 2, during stage A, scheduler system 220 generates a schedule, which includes plans to be executed by robotic system 260, and communicates the schedule to execution manager 210.

In stage B, execution manager 210 communicates the schedule to robotic system 260. After receiving the schedule, robotic system 260 executes the schedule. That is, robotic system 260 performs the tasks of the plans included in the schedule. Robotic system 260 performs the tasks until it arrives at a speculation point, at which point the robotic system can accept additional information in order to proceed with the execution of the schedule. For example, the robotic system may execute the tasks of a current plan while communicating to scheduler system 220 measurements for one or more parameters that represent a current state of the robotic system or its environment. In response to the measurements received at a speculation point, scheduler subsystem 220 determines that the execution of the current plan requires additional resources.

In stages C/D, robotic system 260 uses one or more sensors to determine measurements for one or more parameters that represent the current state of the robotic system or its environment. Robotic system 260 communicates the measurements to scheduler system 200, e.g., by communicating the measurements to execution manager 210. Sensing and measurement subsystem 230 receives the measurements, e.g., from execution manager 210, and determines the current state of robotic system 260 or its environment. For example, the measurements can indicate a quantity of the second resource available.

In stage E, sensing and measurement subsystem 230 communicates data representing the current state of robotic system 260 or its environment to re-scheduler subsystem 240. Using this information, re-scheduler subsystem 240 determines if the particular plan should be revised, and if so, the re-scheduler subsystem generates a revised version of the particular plan based on the measurements for the one or more parameters. The tasks of the revised version of the particular plan replace the tasks of the particular plan at a speculation point of the particular plan.

As an example, the measurements can indicate the current quantity of the second resource available. Re-scheduler subsystem 240 can determine that the current quantity of the second resource is insufficient to perform the tasks that follow the speculation point. Therefore, re-cheduler subsystem 240 can revise the particular plan to include tasks such as moving robotic system 260 to a resource repository, retrieving a quantity of the second resource sufficient to perform one or more tasks, and returning the robotic system to a workstation to perform the one or more tasks.

As another example, the particular plan may assume that a part required for the execution of the particular plan, is at a first location. The measurements can indicate that the part is not at the first location, but rather, at a second location. In response to determining that the part is at the second location, re-scheduler subsystem 240 can generate a revised version of the particular plan having a modified toolpath for the robotic system, to account for the location of the part.

If, in stage E, re-scheduler subsystem 240 determines that the particular plan should be revised, then it generates a revised version of the particular plan. In stage F, re-scheduler subsystem 240 communicates the revised plan to conflict detector 250, which determines whether the revised plan conflicts with any other plans in the schedule.

In stage G, conflict detector 250 communicates any conflicts detected to re-scheduler subsystem 240. Prior to updating the schedule to include the revised plan, re-scheduler subsystem 240 adjusts the schedule based on the conflicts detected by re-scheduler subsystem 240. For example, if conflict detector 250 determines that there is a conflict between the revised version of the particular plan and a conflicting plan, then re-scheduler subsystem 240 can resolve the conflict by adding a dependency between the revised version of the particular and the conflicting plan so that the robotic system executes the conflicting plan only after executing the revised version of the particular plan. Therefore, by modifying the dependency structure of the schedule, re-scheduler system 240 can resolve a conflict without re-planning plans other than the particular plan.

Once all conflicts are detected and resolved by conflict detector 250 and re-scheduler subsystem 240, the reschedule subsystem communicates the conflict-free schedule to execution manager 210. In turn, execution manager 210 communicates the schedule to robotic system 260, which executes each plan of the schedule.

Figure 3:
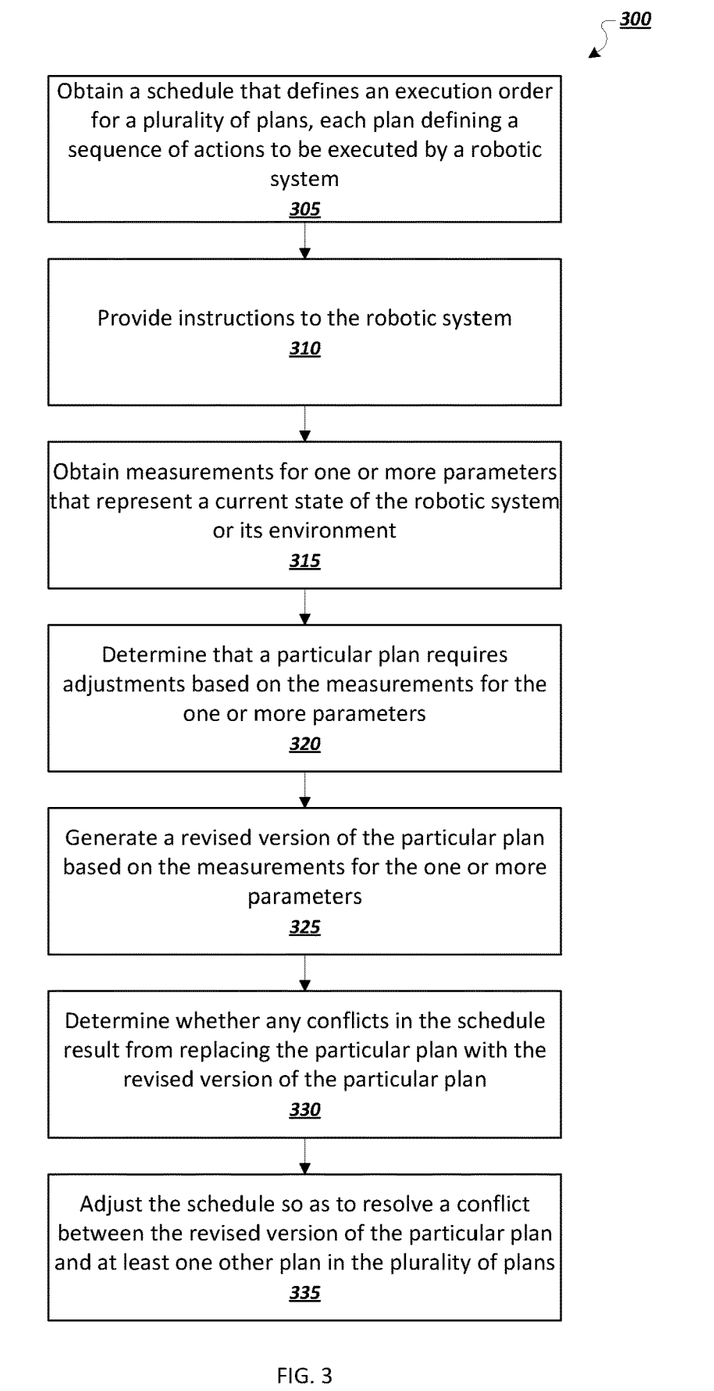
FIG. 3 is an example flow diagram for adjusting a schedule to resolve conflicts between plans.

FIG. 3 is an example flow diagram of an example process 300 for adjusting a schedule of plans to resolve a conflict between plans. The example process can be performed by scheduler system 200 of FIG. 2.

The scheduler system obtains a schedule that defines an execution order for a plurality of plans, each plan defining a sequence of tasks to be executed by a robotic system (305). For example, the scheduler system can include a scheduler subsystem that is configured to generate a schedule based on the tasks to be performed by a robotic system.

In some implementations, the scheduler subsystem can generate the schedule based on at least one of expected execution times for the plurality of plans or expected resource requirements for the plurality of plans. For example, the scheduler subsystem can determine the expected execution times and/or expected resource requirements from historical data, e.g., execution of previous plans.

The scheduler system provides instructions to the robotic system to execute plans from the plurality of plans according to the schedule (310). The scheduler system can communicate the schedule to the robotic system, which can execute the plans according to the schedule. That is, the robotic system can execute the tasks that make up the plans of the schedule.

The scheduler system obtains measurements for one or more parameters that represent a current state of the robotic system or its environment (315). The robotic system uses one or more sensors to obtain the measurements, which it communicates to the scheduler system. Using the measurements, the scheduler system determines the current state of the robotic system or the current state of the environment of the robotic system.

The scheduler system determines that a particular plan requires adjustments based on the measurements for the one or more parameters (320).

In some implementations, the one or more parameters that represent the current state of the robotic system or its environment includes a first parameter that represents a result of one or more tasks that were executed by the robotic system prior to or during the particular plan. As an example, the action may be using a paint sprayer and the first parameter can represent the amount of paint left in the paint sprayer, a measurement of how much paint was applied, and an actual area of an object where the paint was applied. The scheduler system can determine that the particular plan requires adjustments if the amount of paint is insufficient to complete a task or if the area where the paint was applied was incorrect.

In some implementations, the result of the one or more tasks includes a location or a dimension of a component that was made or placed on a product by a robotic system in the course of execution of one or more plans. For example, if the robotic system was moving an object prior to the particular plan, the first parameter can represent the location of the object before the particular plan. As another example, if the robotic system was cutting a sheet of metal, the first parameter can represent the dimensions of the sheet of metal after the robotic system is finished cutting it. If the measured location or dimension differs from an expected value that the scheduler system used to generate the particular plan, the scheduler system can determine that the particularly plan requires adjustments in light of the measured parameters.

The scheduler system generates a revised version of the particular plan based on the measurements for the one or more parameters (325). The scheduler system can include a scheduler subsystem that is configured to receive the measurements for the one or more parameters and determine the current state of the robotic system or the environment of the robotic system. Using the current state of the robotic system or its environment, the scheduler subsystem generates a revised version of the particular plan.

For example, the current state of the robotic system can include the positions of one or more robots of the robotic system or the positions of one or more components of the one or more robots, e.g., the position of an arm of a robot.

The current state of the robotic system can further include a quantity of a material or resource required to perform one or more tasks of the schedule. The current state of the environment of the robot can include the presence of one or more tools required by the robotic system. The current state of the environment can also include the presence of one or more parts to be worked on by the robotic system, e.g., if the tasks of the schedule include assembling an electronic device, then the current state of the environment can indicate the presence of the electronic device.

The current state of the environment of the robot can further include information related to the space occupied by other robots executing plans around the same time as a particular plan that is to be re-planned. The current state of the environment during re-planning may differ from the state of the environment that was initially used by the scheduler system to generate an initial schedule.

In some implementations, the scheduler system generates at least one of an expected execution time or an expected resource requirement for the particular plan based on expected values for the one or more parameters that represent the current state of the robotic system or its environment. The measurements for the one or more parameters, as obtained in stage 320, may be different from the expected values for the one or more parameters.

The scheduler system determines whether any conflicts in the schedule result from replacing the particular plan with the revised version of the particular plan (330). Replacing the particular plan with the revised version of the particular plan may cause a conflict between the revised version of the particular plan and a plan that is independent of the revised version of the particular plan. For example, the schedule may require concurrent execution of the particular plan and the revised version of the particular plan.

As another example, the revised version of the particular plan may include a different starting position or ending position of the robotic system. Therefore, the revised version of the particular plan may conflict with one or more other plans of the schedule.

As another example, a conflict may arise as a result of the schedule requiring concurrent execution of two or more plans that make use of a common resource. In some implementations, the common resource can be space, fuel, or a tool. For example, a conflict would arise if two or more plans both require a paint sprayer, while both are scheduled to execute at the same time.

The scheduler system adjusts the schedule that defines the execution order for the plurality of plans so as to resolve a conflict between the revised version of the particular plan and at least one other plan in the plurality of plans (335). For example, a re-scheduler subsystem of the scheduler system can resolve a conflict between the revised version of the particular plan and another, conflicting plan by delaying the start of the conflicting plan, as described in greater detail with regard to FIG. 4. As another example, adjusting the schedule can include delaying execution of the conflicting plan by adding a constraint to the execution order of the schedule such that the particular plan must be completed before the execution of the conflicting plan.

While, in stage 325, the scheduler system revises the particular plan, the scheduler system adjusts the schedule without revising any plans other than the particular plan.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

An "engine" as used herein refers to a data processing apparatus (e.g., one or more computers, one or more processors) configured to perform operations. The data processing apparatus can be provided in one or more locations, and can assume a centralized or distributed architecture.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the invention have been described. Other implementations are within the scope of the following claims. For example, the actions recited in the claims may be performed in a different order and still achieve desirable results.

What is claimed is:

1. A computer-implemented method, comprising:
obtaining a schedule that defines an execution order for a plurality of plans, each plan defining a sequence of tasks to be executed by a robotic system;
providing instructions to the robotic system to execute plans from the plurality of plans according to the schedule;
obtaining, for a speculation point during execution of a first plan of the plurality of plans according to the schedule, a sensor measurements representing a state of the robotic system or its environment during execution of the first plan;
determining, based on the sensor measurement, that the first plan of the plurality of plans requires one or more additional tasks;
in response to determining from the sensor measurement that the first plan requires one or more additional tasks, generating an adjusted schedule before resuming execution of the first plan, including:
generating a revised version of the first plan to include the additional tasks,
determining that the revised version of the first plan conflicts with a second plan in the plurality of plans, and
in response, adjusting the schedule to delay execution of the second plan until after the revised version of the first plan has completed the additional tasks; and
providing instructions to the robotic system to resume execution from the speculation point using the revised version of the first plan according to the adjusted schedule.

2. The computer-implemented method of claim 1, further comprising:
in response to determining that the revised version of the first plan conflicts with a second plan in the plurality of plans, adding a dependency between the revised version of the first plan and the second plan.

3. The computer-implemented method of claim 2, wherein the dependency conditions execution of the second plan on completion of execution of the revised version of the first plan.

4. The computer-implemented method of claim 1, wherein determining that the revised version of the first plan conflicts with the second plan in the plurality of plans comprises determining that the revised version of the first plan and the second plan would compete for a common resource.

5. The computer-implemented method of claim 1, wherein adjusting the schedule comprises enforcing a constraint on an execution order of each plan in the plurality of plans.

6. The computer-implemented method of claim 1, wherein adjusting the schedule comprises adjusting the schedule without revising any plans in the plurality of plans other than the first plan.

7. The computer-implemented method of claim 1, wherein an initial version of the first plan and the revised version of the first plan have different execution times or different resource requirements.

8. The computer-implemented method of claim 1, wherein the obtained schedule is an initial version of the schedule; and
the method further comprises generating the initial version of the schedule based on at least one of expected execution times for the plurality of plans or expected resource requirements for the plurality of plans, wherein at least one of an expected execution time or an expected resource requirement for the first plan is based on expected values for the one or more parameters that represent the current state of the robotic system or its environment.

9. The computer-implemented method of claim 8, wherein the measurements for the one or more parameters that represent the current state of the robotic system or its environment are different from the expected values for the one or more parameters.

10. The computer-implemented method of claim 1, wherein the one or more parameters that represent the current state of the robotic system or its environment comprise a first parameter that represents a result of executing one or more tasks in the first plan before the first plan completes execution.

11. The computer-implemented method of claim 10, wherein the result of the one or more tasks comprises a location or a dimension of a component that was made or placed on a product by a robotic system during execution of one or more plans.

12. The computer-implemented method of claim 1, wherein the robotic system comprises a plurality of robots configured to work cooperatively in an automated process to fabricate a product.

13. The computing system of claim 1, wherein adjusting the schedule comprises adjusting the schedule without revising any plans in the plurality of plans other than the first plan.

14. A computing system, comprising:
one or more processors; and
one or more non-transitory computer-readable media having instructions stored thereon that, when executed by the one or more processors, cause the one or more processors to perform operations comprising:
obtaining a schedule that defines an execution order for a plurality of plans, each plan defining a sequence of tasks to be executed by a robotic system;
providing instructions to the robotic system to execute plans from the plurality of plans according to the schedule;
obtaining, for a speculation point during execution of a first plan of the plurality of plans according to the schedule, a sensor measurement representing a state of the robotic system or its environment during execution of the first plan;
determining, based on the sensor measurement, that the first plan of the plurality of plans requires one or more additional tasks;
in response to determining from the sensor measurement that the first plan requires one or more additional tasks, generating an adjusted schedule before resuming execution of the first plan, including:
generating a revised version of the first plan to include the additional tasks,
determining that the revised version of the first plan conflicts with a second plan in the plurality of plans, and
in response, adjusting the schedule to delay execution of the second plan until after the revised version of the first plan has completed the additional tasks; and
providing instructions to the robotic system to resume execution from the speculation point using the revised version of the first plan according to the adjusted schedule.

15. The computing system of claim 14, wherein the operations further comprise:
in response to determining that the revised version of the first plan conflicts with a second plan in the plurality of plans, adding a dependency between the revised version of the first plan and the second plan.

16. The computing system of claim 14, wherein determining that the revised version of the first plan conflicts with the second plan in the plurality of plans comprises determining that the revised version of the first plan and the second plan would compete for a common resource.

17. One or more non-transitory computer-readable media having instructions stored thereon that, when executed by one or more processors, cause performance of operations comprising:
obtaining a schedule that defines an execution order for a plurality of plans, each plan defining a sequence of tasks to be executed by a robotic system;
providing instructions to the robotic system to execute plans from the plurality of plans according to the schedule;
obtaining, for a speculation point during execution of a first plan of the plurality of plans according to the schedule, a sensor measurement representing a state of the robotic system or its environment during execution of the first plan;
determining, based on the sensor measurement, that the first plan of the plurality of plans requires one or more additional tasks;
in response to determining from the sensor measurement that the first plan requires one or more additional tasks, generating an adjusted schedule before resuming execution of the first plan, including:
generating a revised version of the first plan to include the additional tasks,
determining that the revised version of the first plan conflicts with a second plan in the plurality of plans, and
in response, adjusting the schedule to delay execution of the second plan until after the revised version of the first plan has completed the additional tasks; and
providing instructions to the robotic system to resume execution from the speculation point using the revised version of the first plan according to the adjusted schedule.

* * * * *